US009191308B2

(12) United States Patent
Lin

(10) Patent No.: US 9,191,308 B2
(45) Date of Patent: Nov. 17, 2015

(54) METHOD AND SYSTEM FOR DETERMINING INITIATOR AND TERMINATOR IN FORWARDING ADJACENCY LABEL SWITCHED PATH

(75) Inventor: Xuefeng Lin, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 948 days.

(21) Appl. No.: 13/258,194

(22) PCT Filed: May 5, 2010

(86) PCT No.: PCT/CN2010/072464
§ 371 (c)(1), (2), (4) Date: Feb. 6, 2012

(87) PCT Pub. No.: WO2011/017946
PCT Pub. Date: Feb. 17, 2011

(65) Prior Publication Data

US 2012/0134296 A1 May 31, 2012

(30) Foreign Application Priority Data

Aug. 14, 2009 (CN) .......................... 2009 1 0165291

(51) Int. Cl.
*H04L 12/28* (2006.01)
*H04L 12/717* (2013.01)
*H04L 12/701* (2013.01)
*H04L 12/751* (2013.01)
(Continued)

(52) U.S. Cl.
CPC ................ *H04L 45/42* (2013.01); *H04L 45/00* (2013.01); *H04L 45/02* (2013.01); *H04L 45/44* (2013.01); *H04L 45/50* (2013.01)

(58) Field of Classification Search
CPC ......... H04L 45/50; H04L 45/00; H04L 45/02; H04L 45/42; H04L 45/44
USPC ........................................................ 370/254
See application file for complete search history.

(56) References Cited

U.S. PATENT DOCUMENTS

| | | | | |
|---|---|---|---|---|
| 2009/0135815 | A1* | 5/2009 | Pacella | 370/389 |
| 2012/0044936 | A1* | 2/2012 | Bellagamba et al. | 370/392 |
| 2012/0230330 | A1* | 9/2012 | Fu et al. | 370/389 |
| 2012/0271928 | A1* | 10/2012 | Kern et al. | 709/220 |

FOREIGN PATENT DOCUMENTS

| | | |
|---|---|---|
| CN | 101163090 A | 4/2008 |
| WO | 2008046322 A1 | 4/2008 |

OTHER PUBLICATIONS

"Requirements for GMPLS-Based Multi-Region and Multi-Layer Networks (MRN/MLN)"; Network Working Group, 5212, Informational; K, Shiomoto et al., Jul. 2008; XP15057207A; see pp. 1-28.

(Continued)

*Primary Examiner* — Shripal Khajuria
*Assistant Examiner* — Faisal Choudhury
(74) *Attorney, Agent, or Firm* — Ling Wu; Stephen Yang; Ling and Yang Intellectual Property

(57) ABSTRACT

A method for determining beginning and end nodes in a FALSP, applied to a multilayer network using an higher-layer signaling triggering model to establish the FALSP is provided, comprising: a path compute element, when a computed service path comprises FALSPs of one or more layers, encapsulating FALSP path information of each layer into a Secondary Explicit Route Object (SERO) respectively to return together with service path information through inquiry response message to a beginning node in a first layer initiating the inquiry; after receiving them, a node in the service path determining whether the node is a beginning node in the FALSP of a layer according to said FALSP path information, if yes, learning that the FALSP is the FALSP of next layer, and determining an end node in the FALSP of the next layer according to FALSP path information of the next layer. A multilayer network is also provided.

15 Claims, 1 Drawing Sheet

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Length             | Class-Num (200)| C-Type (TBD) |
+-+-+-+-+-+-+-+-+-+-+-+-+-+-+-+-+-+-+-+-+-+-+-+-+-+-+-+-+-+-+-+-+
|                                                               |
//                          Subobjects                         //
|                                                               |
+-+-+-+-+-+-+-+-+-+-+-+-+-+-+-+-+-+-+-+-+-+-+-+-+-+-+-+-+-+-+-+-+
```

(51) Int. Cl.
*H04L 12/721* (2013.01)
*H04L 12/723* (2013.01)

(56) References Cited

OTHER PUBLICATIONS

ZTE Corporation, A Path Computation Element (PCE) Solution for multilayer Isp, draft-lin-pce-ccamp-multilayer-Isp-00, Oct. 19, 2009.

Alcatel, GMPLS Segment Recovery, RFC4873, May 2007.

Ntt, Framework for PCE-Based Inter-Layer MPLS and GMPLS Traffic Engineering, draft-ietf-pce-inter-layer—frwk-10. txt, Mar. 2009.

Data Connection Ltd. MPLS-TP recovery control plane analysis, draft-mcwalter-mpls-tp-recovery-cp-analysis-00. txt, Jul. 1, 2009.

International Search Report for PCT/CN2010/072464 dated Jul. 19, 2010.

* cited by examiner

METHOD AND SYSTEM FOR DETERMINING INITIATOR AND TERMINATOR IN FORWARDING ADJACENCY LABEL SWITCHED PATH

TECHNICAL FIELD

The present invention relates to a transmission network multi-level network technology, and in particular, to a method and system for a beginning node on the border of the layer in a multilayer network determining a beginning node and an end node in a forwarding adjacency label switched path.

BACKGROUND OF THE RELATED ART

With the developing of transport network, the network topology is more and more complicated and the service volume is larger and larger. To meet the requirement of scheduling granularities of different services, ASON (Automatic Switch Optical Network) supports several switching capabilities and service scheduling of different rates under each switching capability. Multilayer network is constituted by the support for the various switching capabilities and different rates under each switching capability, such as the multilayer networks of MPLS (Multiprotocol Label Switching) and GMPLS (Generalized Multiprotocol Label Switching).

A Label Switched Path (LSP) is established on a boarder node of a layer. If the LSP is flooded as a Traffic Engineering (TE) link of the higher layer, the LSP is referred to as a FA (Forwarding Adjacency) LSP, and the TE link is referred to as FA (Forwarding Adjacency). Routing adjacency relationship does not exist between end points of FA, but a signaling adjacency relationship exists therein.

The FA LSP may be automatically established or manually established.

The manual way of establishing the FA LSP means to plan and configure well in advance. The most deficiency of the way is that it is not flexible enough and the efficiency of the whole network is not optimal.

To establish automatically, the FA may use three models: a Path Compute Element-Virtual Network Manager (PCE-VNTM) cooperative model, Network Manager System-Virtual Network Manager (NMS-VNTM) cooperative model or higher-layer signaling triggering model. The first two models both introduce VNTM, which may lead to the difficulty of layout, the increasing of content that needs to be coordinated and interchanged, the increasing of the time for LSP establishing and instability.

When the higher-layer signaling triggering model is used, it is difficult for the beginning node on the boarder of the layer to learn the beginning node and the end node in the FA LSP to initiate an establishment of the LSP to the end node in the FA LSP. There is no related resolution now.

SUMMARY OF THE INVENTION

The technical problem to be solved in the invention is to provide a method and system for determining a beginning node and an end node in a forwarding adjacency label switched path, to make the beginning node on the border of a layer capable of determining the beginning node and the end node in the Forwarding Adjacency Label Switched Path (FA LSP).

To solve the above problem, the invention provides a method for determining a beginning node and an end node in a forwarding adjacency label switched path, applied to a multilayer network using an higher signaling triggering model to establish the FA LSP, wherein, the method comprises:

a path compute element, when a computed service path comprises FA LSPs of one or more layers, encapsulating path information of the FA LSP of each layer in a Secondary Explicit Route Object (SERO) respectively and returning it together with service path information through inquiry response message to a beginning node in a first layer initiating the inquiry;

a node in the service path receiving the inquiry response message or a path message sent from an upstream node, determining whether the node is the beginning node in the FA LSP of a certain layer according to the path information of the FA LSP included in the SERO, if yes, learning that the FA LSP is the FA LSP of next layer, and determining an end node in the FA LSP of the next layer according to the path information of the FA LSP of the next layer.

The above method further comprises:

the node in the service path, after determining that the node is the beginning node in the FA LSP of the next layer and determining the end node in the FA LSP of the next layer, establishing a signaling flow by a standard LSP (label switched path), establishing the LSP of the next layer between the beginning node and the end node in the FA LSP of the next layer, and the node retaining the SERO encapsulating the path information of the FA LSP other than the SERO encapsulating the path information of the FA LSP of the next layer in the received inquiry response message or the path message into the path message sent to a downstream node in the FA LSP of the next layer.

The above method further comprises:

the node in the service path retaining all the SEROs in the received inquiry response message or the path message into the path message sent to a downstream node if the node determines that the node is not the beginning node in any FA LSP.

Wherein, the SERO is a SERO having a new type (C-Type) value, wherein, each node subobject in the SERO is each node in the FA LSP.

Wherein, the path information of the FA LSP of each layer comprises identifier information of each node included in the FA LSP of the layer in sequence which begins with the beginning node.

Wherein, the step of the node in the service path determining whether the node is the beginning node in the FA LSP of the certain layer comprises: the node in the service path receiving the inquiry response message or the path message, if judging that the message includes the SERO having a new type value, analyzing all the SEROs having new type values and obtaining the path information of the FA LSP included therein, and comparing the identifier information of the node with the identifier information of the beginning node in the path information of the FA LSP in each layer, and determining that the node is the beginning node in the FA LSP of the layer if the identifier information of the node is the same as the identifier information of the beginning node in the FA LSP of a layer, and determining that the node is not the beginning node in any FA LSP if the identifier information of the node is not the same as the identifier information of the beginning node of any FA LSP of all the layers.

The invention also provides a multilayer network for determining a beginning node and an end node in a forwarding adjacency label switched path, comprising a path compute element and nodes in each layer, wherein, the path compute element is configured to, when a computed service path comprises FA LSPs of one or more layers, encapsulate path information of the FA LSP of each layer in a SERO (Secondary Explicit Route Object) respectively and return it together with service path information through inquiry response message to a beginning node in a first layer initiating the inquiry;

the node in the service path is configured to receive the inquiry response message or a path message sent from an upstream node, determine whether the node is the beginning node in the FA LSP of a certain layer according to the path information of the FA LSP included in the SERO in the message, if yes, learn that the FA LSP is a FA LSP of next layer, and determine an end node in the FA LSP of the next layer according to the path information of the FA LSP of the next layer.

Wherein: the node in the service path is further configured to:

after determining that the node is the beginning node in the FA LSP of the next layer and determining the end node in the FA LSP of the next layer, establish a signaling flow by a standard label switched path (LSP), establish the LSP of the next layer between the beginning node and the end node in the FA LSP of the next layer, and retain the SERO encapsulating the path information of the FA LSP other than the SERO encapsulating the path information of the FA LSP of the next layer in the received inquiry response message or the path message into the path message sent to a downstream node in the FA LSP of the next layer; and retain all the SEROs in the received inquiry response message or the path message into the path message sent to a downstream node if the node determines that the node is not the beginning node in any FA LSP.

Wherein: the SERO is a SERO having a new type value (C-Type), wherein, each node subobject in the SERO is the node in the FA LSP.

Wherein: the path information of the FA LSP of each layer comprises identifier information of each node included in the FA LSP of the layer in sequence which begins with the beginning node;

the node in the service path is configured to receive the inquiry response message or the path message, if judging that the message includes the SERO having a new type value, analyze all the SEROs having new type values and obtain the path information of the FA LSP included therein, and compare the identifier information of the node with the identifier information of the beginning node in the path information of the FA LSP in each layer, and determine that the node is the beginning node in the FA LSP of the layer if the identifier information of the node is the same as the identifier information of the beginning node in the FA LSP of the layer, and determine that the node is not the beginning node in any FA LSP if the identifier information of the node is not the same as the identifier information of the beginning node of any FA LSP of all the layers.

The invention also provides a node for determining a beginning node and an end node in a forwarding adjacency label switched path, wherein, the node is configured to:

after receiving inquiry response message sent from a path compute element or a path message sent from an upstream node, determine whether the node is the beginning node in the FA LSP (Forwarding Adjacency Label Switched Path) of a certain layer according to the path information of the FA LSP included in a SERO (Secondary Explicit Route Object) in the message, if yes, learn that the FA LSP is a FA LSP of next layer, then determine an end node in the FA LSP of the next layer according to the path information of the FA LSP of the next layer, wherein, the inquiry response message comprises path information of the FA LSP of each layer included in the service path where the node is located, and the path information of the FA LSP of each layer is encapsulated in the SERO respectively.

Wherein, the node is further configured to:

after determining that the node is the beginning node in the FA LSP of the next layer and determining the end node in the FA LSP of the next layer, establish a signaling flow by a standard label switched path (LSP), establish the LSP of the next layer between the beginning node and the end node in the FA LSP of the next layer, and retain the SERO encapsulating the path information of the FA LSP other than the SERO encapsulating the path information of the FA LSP of the next layer in the received inquiry response message or the path message into the path message sent to a downstream node in the FA LSP of the next layer; and, retain all the SEROs in the received inquiry response message or the path message in the path message sent to a downstream node if the node determines that the node is not the beginning node in any FA LSP.

Wherein, the SERO is a SERO having a new type value (C-Type), wherein, each node subobject in the SERO is the node in the FA LSP.

Wherein, the path information of the FA LSP of each layer comprises identifier information of each node included in the FA LSP of the layer in sequence which begins with the beginning node;

the node is configured to receive the inquiry response message or the path message, if judging that the message includes the SERO having a new type value, analyze all the SEROs having new type values and obtain the path information of the FA LSP included therein, and compare the identifier information of the node with the identifier information of the beginning node in the path information of the FA LSP in each layer, and determine that the node is the beginning node in the FA LSP of the layer if the identifier information of the node is the same as the identifier information of the beginning node in the FA LSP of the layer, and determine that the node is not the beginning node in any FA LSP if the identifier information of the node is not the same as the identifier information of the beginning node of any FA LSP of all the layers.

A path compute element for determining a beginning node and an end node in a forwarding adjacency label switched path, wherein:

the path compute element is configured to, when a computed service path comprises Forwarding Adjacency Label Switched Paths (FA LSP) of one or more layers, encapsulate path information of the FA LSP of each layer into a SERO (Secondary Explicit Route Object) respectively and return it together with service path information through inquiry response message to a beginning node in a first layer initiating the inquiry, so as to make a node in the service path, after receiving the inquiry response message or a path message sent from an upstream node, determine whether the node is the beginning node in the FA LSP of a certain layer according to the path information of the FA LSP included in the SERO in the message, if yes, learn that the FA LSP is the FA LSP of next layer, then determine an end node in the FA LSP of the next layer according to the path information of the FA LSP of the next layer.

The above implementing scheme is used for the automatic establishment of the FA LSP in the higher-layer signaling triggering model, and discloses the flow of the automatic establishment of the FA LSP with combination of the SERO by adding new type to the SERO in the Resource Reservation Protocol (RSVP) and bringing the SERO into the Path Computation Element communication Protocol (PCEP), to make the beginning node on the border of layers capable of determining the beginning node and the end node in the FA LSP.

PREFERRED EMBODIMENTS OF THE PRESENT INVENTION

The invention is described below with reference to the drawings.

Figure 1:
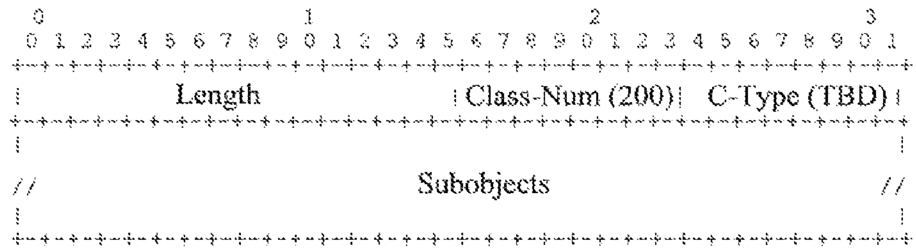
FIG. 1 is a schematic diagram of the SERO types extended in an example of the invention.

As shown in FIG. 1, in the example, the SERTO (Secondary Explicit Route Object) is extended to add a new type used to indicate that each node subobject in the SERO is a node in the FA LSP. Class-Num=200, which is used to indicate the SERO; C-Type=TBD, i.e. the SERO has a new type value (C-Type), and the specific number of the type value is to be defined by the standard organization IANA, and the TBD is the short of the "To be defined", which represents to be determined. Each node subobject in the SERO having the new type value is a node in the FA LSP.

Figure 2:
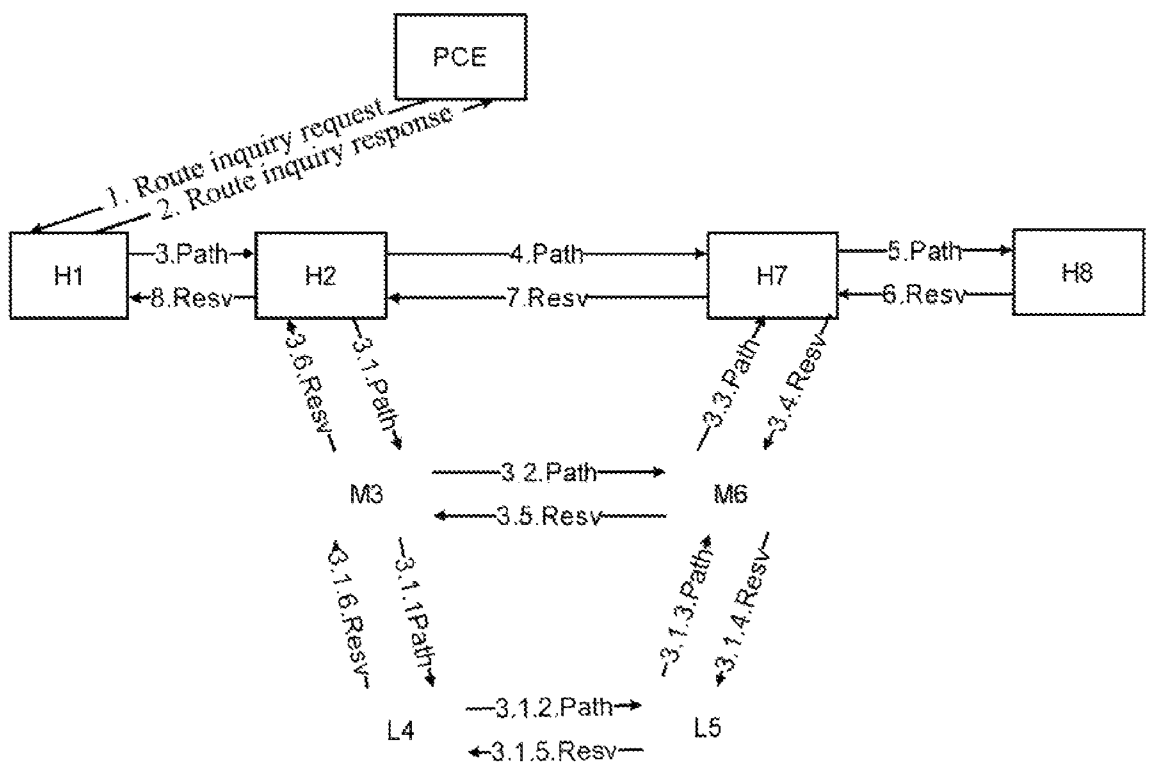
FIG. 2 is a flowchart of the automatic establishment of the FA LSP in an example of the invention.

FIG. 2 shows the multilayer (three-layer) network which the example is based on and the flow of sending inter-node signaling. The multilayer network which the invention is based on is not limited to three-layer network. With reference to the diagram, the flow of establishing the FA LSP in the example comprises the following steps.

Step 1, the higher-layer beginning node H1 sends a path inquiry request to the PCE (Path Compute Element) when establishing service.

Step 2, after receiving the path inquiry request, the PCE computes the path and returns the path information to the higher-layer beginning node H1 through a path inquiry response, and further needs to encapsulate the role information of the beginning node and the end node of the FA LSP in each layer respectively into the SERO having new type values to return to the higher-layer beginning node H1 when the path includes FA LSPs of one or more layers.

The service path computed in the example is H1-H2-M3-L4-L5-M6-H7-H8, which comprises FA LSP1 constituted of nodes H2-M3-L4-L5-M6-H7, which is also known as middle-layer FA LSP hereafter, wherein, the H2 and H7 are higher-layer nodes; and also comprises FA LSP2 constituted of nodes M3-L4-L5-M6, which is also known as lower-layer FA LSP hereafter, wherein, M3 and M6 are middle-layer nodes.

In the path inquiry response message sent from the PCE to H1, ERO is {H2, H7}, SERO one is {H2, M3, M6, H7}, and SERO two is {M3, L4, L5, M6}.

Step 3, the beginning node H1 sends path message to the higher-layer boarder node H2, and the message carries an ERO of {H2, H7}, a SERO one of {H2, M3, M6, H7} and a SERO two of {M3, L4, L5, M6}.

Step 3.1, after receiving the path message, the boarder node H2, by analyzing the ERO and SERO in the path message, finds that the address of the first node H2 in the SERO one is the same as the present node and then determines that the present node is the beginning node of the middle-layer FA LSP, and finds that the last node in the SERO one is H7 and determines that H7 is the end node of the higher-layer FA LSP. H2 firstly maintains the higher-layer path message, and establishes a middle-layer LSP between H2 and H7 through a standard LSP-signaling-establishing flow. In the process, H2 firstly sends a path message to the downstream node L3 of the middle-layer LSP, and the SERO one is transformed into ERO in the message. At the moment, the ERO carried in the message is {M3, M6}, SERO two is not changed and is {M3, L4, L5, M6}, and the information of the end node H7 of the middle-layer LSP is encapsulated in the session object of the path message. The transforming processing of the beginning node of each FA LSP on the SERO is also the standard processing flow for the SERO provided in the protocol.

Step 3.1.1, the middle-layer node M3, after receiving the middle-layer path message, determines that the present node is the beginning node of the lower-layer FA LSP by analyzing the ERO and SERO object two in the path message and learning that the address of the first node M3 in the SERO two is the same as the present node, and determines that M6 which is the last node in the SERO two is the end node of the lower-layer FA LSP. M3 firstly maintains the middle-layer path message, and establishes a lower-layer LSP between M3 and M6 through a standard LSP-signaling-establishing flow. In the process, M3 firstly sends a path message to the downstream node L4 in the lower layer, and the SERO two is transformed into ERO in the message. The ERO carried in the message is {L4, L5}, and the information of the end node M6 of the middle-layer LSP is encapsulated into the session object of the path message.

The lower-layer standard LSP establishing flow is continued in step 3.1.2-step 3.1.7.

Step 3.2, after the boarder node M3 receives the lower-layer Resv message returned by the lower-layer node L4, the lower-layer LSP is established and the establishment of the middle-layer is awaken and the establishing process of the middle-layer LSP is continued.

The middle-layer standard LSP establishing flow is continued in step 3.3-step 3.6.

Step 4, after the higher boarder node H2 receives the middle-layer Resv message returned by the middle-layer node M3, the middle-layer LSP is completely established and the establishment of the higher-layer LSP is awaken and the establishing process of the higher-layer LSP is continued.

The standard signaling flow of the higher-layer LSP establishment is continued in steps 5-8, which is not described in detail here.

The above example takes three layers for instance. In other examples, the scenes of two layers or more than three layers may be comprised. Under the scenes, the highermost layer may be called as the first layer, and then the other layers are called in turn as the second layer, the third layer, . . . , and so on. The second layer and other layers below all belong to FA LSP, and the boarder beginning node of each layer determines the beginning node and the end node of the present-layer FA LSP by the same way as the above example.

The invention provides a multilayer network for determining a beginning node and an end node of a forwarding adjacency label switched path, comprising a path compute element and nodes in each layer, wherein, the path compute element is configured to, when a computed service path comprises FA LSPs of one or more layers, encapsulate path information of the FA LSP of each layer into a Secondary Explicit Route Object (SERO) respectively and return it together with service path information through inquiry response message to a beginning node in a first layer initiating the inquiry;

the node in the service path is configured to, after receiving the inquiry response message or a path message sent from an upstream node, determine whether the node is the beginning node in the FA LSP of a certain layer according to the path information of the FA LSP included in the SERO in the message, if yes, learn that the FA LSP is the FA LSP of next layer, and determining an end node in the FA LSP of the next layer according to the path information of the FA LSP of the next layer.

Wherein, the node in the service path is further configured to:

after determining that the node is the beginning node in the FA LSP of the next layer and determining the end node in the FA LSP of the next layer, establish a signaling flow by a standard LSP (label switched path), establish the LSP of the next layer between the beginning node and the end node in the FA LSP of the next layer, and retain the SEROs encapsulating the path information of the FA LSP other than the SERO encapsulating the path information of the FA LSP of the next layer in the received inquiry response message or the path message into the path message sent to a downstream node in the FA LSP of the next layer; and retain all the SEROs in the received inquiry response message or the path message into the path message sent to a downstream node if the node determines that the node is not the beginning node in any FA LSP.

Wherein, the SERO is a SERO having a new type value (C-Type), wherein, each node subobject in the SERO is the node in the FA LSP.

Wherein, the path information of the FA LSP of each layer encapsulated in the SERO by the path compute element comprises identifier information of each node included in the FA LSP of the layer in sequence which begins with the beginning node; the node in the service path is configured to, after receiving the inquiry response message or the path message, if judging that the message includes the SERO having a new type value, analyze all the SEROs having new type values and obtain the path information of the FA LSP included therein, and compare the identifier information of the node with the identifier information of the beginning node in the path information of the FA LSP in each layer, and determine that the node is the beginning node in the FA LSP of the layer if the identifier information of the node is the same as the identifier information of the beginning node in the FA LSP of the layer, and determine that the node is not the beginning node in any FA LSP if the identifier information of the node is not the same as the identifier information of the beginning node of any FA LSP of all the layers The invention provides a node for determining a beginning node and an end node in a forwarding adjacency label switched path, wherein, the node is configured to:

after receiving inquiry response message sent from a path compute element or a path message sent from an upstream node, determine whether the node is the beginning node in the FA LSP (Forwarding Adjacency Label Switched Path) of a certain layer according to the path information of the FA LSP included in a Secondary Explicit Route Object (SERO) in the message, if yes, learn that the FA LSP is the FA LSP of next layer, then determine an end node in the FA LSP of the next layer according to the path information of the FA LSP of the next layer, wherein, the inquiry response message comprises path information of the FA LSP of each layer included in the service path where the node is located, and the path information of the FA LSP of each layer is encapsulated into the SERO respectively.

Wherein, the node is further configured to: after determining that the node is the beginning node in the FA LSP of the next layer and determining the end node in the FA LSP of the next layer, establish a signaling flow by a standard LSP (label switched path), establish the LSP of the next layer between the beginning node and the end node in the FA LSP of the next layer, and retain the SEROs encapsulating the path information of the FA LSP other than the SERO encapsulating the path information of the FA LSP of the next layer in the received inquiry response message or the path message into the path message sent to a downstream node in the FA LSP of the next layer; and, retain all the SEROs in the received inquiry response message or the path message into the path message sent to a downstream node if the node determines that the node is not the beginning node in any FA LSP.

Wherein, the SERO is a SERO having a new type value (C-Type), wherein, each node subobject in the SERO is the node in the FA LSP.

Wherein, the path information of the FA LSP of each layer comprises identifier information of each node included in the FA LSP of the layer in sequence which begins with the beginning node;

the node is configured to receive the inquiry response message or the path message, if judging that the message includes the SERO having a new type value, analyze all the SEROs having new type values and obtain the path information of the FA LSP included therein, and compare the identifier information of the node with the identifier information of the beginning node in the path information of the FA LSP in each layer, and determine that the node is the beginning node in the FA LSP of the layer if the identifier information of the node is the same as the identifier information of the beginning node in the FA LSP of the layer, and determine that the node is not the beginning node in any FA LSP if the identifier information of the node is not the same as the identifier information of the beginning node of any FA LSP of all the layers.

The invention further provides a path compute element for determining a beginning node and an end node in a forwarding adjacency label switched path (FA LAP), wherein:

the path compute element is configured to, when a computed service path comprises FA LSPs of one or more layers, encapsulate path information of the FA LSP of each layer into a Secondary Explicit Route Object (SERO) respectively and return it together with service path information through inquiry response message to a beginning node in a first layer initiating the inquiry to make a node in the service path, after receiving the inquiry response message or path message sent from an upstream node, determine whether the node is the beginning node in the FA LSP of a certain layer according to the path information of the FA LSP included in the SERO in the message, if yes, learn that the FA LSP is the FA LSP of next layer, then determine an end node in the FA LSP of the next layer according to the path information of the FA LSP of the next layer.

INDUSTRIAL APPLICABILITY

The invention is used for the automatic establishment of the FA LSP in higher-layer signaling triggering model, and discloses the flow of the automatic establishment of the FA LSP with combination of the SERO by adding new type to the SERO in the Resource Reservation Protocol (RSVP) and bringing the SERO into the Path Computation Element communication Protocol (PCEP), to make the beginning node on the border of layers capable of determining the beginning node and the end node in the FA LSP.

What is claimed is:

1. A method for determining a beginning node and an end node in a forwarding adjacency label switched path (FA LSP), applied to a multilayer network using an higher-layer signaling triggering model to establish the FA LSP, wherein, the method comprises:

a path compute element, when a computed service path comprises FA LSPs of one or more layers, encapsulating path information of the FA LSP of each layer into a Secondary Explicit Route Object (SERO) respectively to return together with service path information through inquiry response message to a beginning node in a first layer initiating the inquiry;

a node in the service path receiving the inquiry response message or a path message sent from an upstream node, determining whether the node is a beginning node in the FA LSP of a certain layer according to the path information of the FA LSP included in the SERO, if yes, learning that the FA LSP is an FA LSP of next layer, and determining an end node in the FA LSP of the next layer according to the path information of the FA LSP of the next layer;

the node in the service path, after determining that the node is the beginning node in the FA LSP of the next layer and determining the end node in the FA LSP of the next layer, establishing a signaling flow by a standard label switched path (LSP), establishing the LSP of the next layer between the beginning node and the end node in the FA LSP of the next layer, and the node retaining the SEROs encapsulating the path information of the FA LSP other than the SERO encapsulating the path information of the FA LSP of the next layer in the received inquiry response message or the path message into the path message sent to a downstream node in the FA LSP of the next layer.

2. The method according to claim 1, further comprising:

the node in the service path retaining all the SEROs in the received inquiry response message or the path message into the path message sent to a downstream node if the node determines that the node is not a beginning node in any FA LSP.

3. The method according to claim 1, wherein, the SERO is a SERO having a new type value (C-Type), wherein, each node subobject in the SERO is the node in the FA LSP.

4. The method according to claim 3, wherein, the path information of the FA LSP of each layer comprises identifier information of each node included in the FA LSP of the layer in sequence which begins with the beginning node.

5. The method according to claim 4, wherein, the step of the node in the service path determining whether the node is the beginning node in the FA LSP of the certain layer comprises: the node in the service path receiving the inquiry response message or the path message, if judging that the message includes a SERO having a new type value, analyzing all the SEROs having new type values and obtaining the path information of the FA LSP included therein, and comparing the identifier information of the node with the identifier information of the beginning node in the path information of the FA LSP in each layer, and determining that the node is a beginning node in the FA LSP of a layer if the identifier information of the node is the same as the identifier information of the beginning node in the FA LSP of the layer, and determining that the node is not a beginning node in any FA LSP if the identifier information of the node is not the same as the identifier information of the beginning node of any FA LSP of all the layers.

6. A multilayer network for determining a beginning node and an end node in a forwarding adjacency label switched path (FA LSP), comprising a path compute element and nodes in each layer, wherein, the path compute element is configured to, when a computed service path comprises FA LSPs of one or more layers, encapsulate path information of the FA LSP of each layer into a Secondary Explicit Route Object (SERO) respectively to return together with service path information through inquiry response message to a beginning node in a first layer initiating the inquiry;

the node in the service path is configured to receive the inquiry response message or a path message sent from an upstream node, determine whether the node is a beginning node in the FA LSP of a certain layer according to the path information of the FA LSP included in the SERO in the message, if yes, learn that the FA LSP is an FA LSP of next layer, and determining an end node in the FA LSP of the next layer according to the path information of the FA LSP of the next layer;

wherein the node in the service path is further configured to:

after determining that the node is the beginning node in the FA LSP of the next layer and determining the end node in the FA LSP of the next layer, establish a signaling flow by a standard label switched path (LSP), establish the LSP of the next layer between the beginning node and the end node in the FA LSP of the next layer, and retain the SEROs encapsulating the path information of the FA LSP other than the SERO encapsulating the path information of the FA LSP of the next layer in the received inquiry response message or the path message into the path message sent to a downstream node in the FA LSP of the next layer.

7. The multilayer network according to claim 6, wherein the node in the service path is further configured to:

retain all the SEROs in the received inquiry response message or the path message into the path message sent to a downstream node if the node determines that the node is not the beginning node in any FA LSP.

8. The multilayer network according to claim 7, wherein:

the SERO is a SERO having a new type value (C-Type), each node subobject in the SERO is the node in the FA LSP.

9. The multilayer network according to claim 6, wherein:

the SERO is a SERO having a new type value (C-Type), each node subobject in the SERO is the node in the FA LSP.

10. The multilayer network according to claim 9, wherein:

the path information of the FA LSP of each layer comprises identifier information of each node included in the FA LSP of the layer in sequence which begins with the beginning node;

the node in the service path is configured to receive the inquiry response message or the path message, if judging that the message includes a SERO having a new type value, analyze all the SEROs having new type values and obtain the path information of the FA LSP included therein, and compare the identifier information of the node with the identifier information of the beginning node in the path information of the FA LSP in each layer, and determine that the node is a beginning node in the FA LSP of a layer if the identifier information of the node is the same as the identifier information of the beginning node in the FA LSP of the layer, and determine that the node is not a beginning node in any FA LSP if the identifier information of the node is not the same as the identifier information of the beginning node of any FA LSP of all the layers.

11. A node for determining a beginning node and an end node in a forwarding adjacency label switched path (FA LSP), comprising a processor and a non-transitory computer-readable medium in which a set of processor executable instructions are stored and when the instructions are executed, it causes the processor to perform following steps:

after receiving inquiry response message sent from a path compute element or a path message sent from an upstream node, determining whether the node is the first beginning node in the FA LSP of a certain layer according to path information of the FA LSP included in a Secondary Explicit Route Object (SERO) in the message, if yes, learn that the FA LSP is an FA LSP of next layer, then determining an end node in the FA LSP of the next layer according to the path information of the FA LSP of the next layer, wherein, the inquiry response message comprises the path information of the FA LSP of each layer included in the service path where the node is located, and the path information of the FA LSP of each layer is encapsulated into a SERO respectively;

after determining that the node is the beginning node in the FA LSP of the next layer and determining the end node in the FA LSP of the next layer, establishing a signaling flow by a standard label switched path (LSP), establishing the LSP of the next layer between the beginning node and the end node in the FA LSP of the next layer, and retaining the SEROs encapsulating the path information of the FA LSP other than the SERO encapsulating the path information of the FA LSP of the next layer in the received inquiry response message or the path message into the path message sent to a downstream node in the FA LSP of the next layer.

12. The node according to claim 11, wherein, the node further retaining all the SEROs in the received inquiry response message or the path message into the path message sent to a downstream node if the node determines that the node is not a beginning node in any FA LSP.

13. The node according to claim 12, wherein, the SERO is a SERO having a new type value (C-Type), wherein, each node subobject in the SERO is the node in the FA LSP.

14. The node according to claim 11, wherein, the SERO is a SERO having a new type value (C-Type), wherein, each node subobject in the SERO is the node in the FA LSP.

15. The node according to claim 14, wherein, the path information of the FA LSP of each layer comprises identifier information of each node included in the FA LSP of the layer in sequence which begins with the beginning node;

the node receiving the inquiry response message or the path message, if judging that the message includes the SERO having a new type value, analyzing all the SEROs having new type values and obtaining the path information of the FA LSP included therein, and comparing the identifier information of the node with the identifier information of the beginning node in the path information of the FA LSP in each layer, determining that the node is a beginning node in the FA LSP of a layer if the identifier information of the node is the same as the identifier information of the beginning node in the FA LSP of the layer, and determining that the node is not a beginning node in any FA LSP if the identifier information of the node is not the same as the identifier information of the beginning node of any FA LSP of all the layers.

* * * * *